United States Patent
Diggins

(10) Patent No.: US 10,091,543 B2
(45) Date of Patent: Oct. 2, 2018

(54) MONITORING AUDIO-VISUAL CONTENT WITH CAPTIONS

(71) Applicant: Snell Advanced Media Limited, Newbury, Berkshire (GB)

(72) Inventor: Jonathan Diggins, Lovedean (GB)

(73) Assignee: Snell Advanced Media Limited, Newbury (GB)

( * ) Notice: Subject to any disclaimer, the term of this patent is extended or adjusted under 35 U.S.C. 154(b) by 0 days.

(21) Appl. No.: 15/489,095

(22) Filed: Apr. 17, 2017

(65) Prior Publication Data

US 2017/0302989 A1   Oct. 19, 2017

(30) Foreign Application Priority Data

Apr. 18, 2016   (GB) .................................. 1606743.1

(51) Int. Cl.
 H04N 21/234  (2011.01)
 H04N 21/43   (2011.01)
 H04N 21/44   (2011.01)
 H04N 21/845  (2011.01)
 G06K 9/00    (2006.01)
 H04N 21/488  (2011.01)
 G11B 27/32   (2006.01)
 H04N 7/035   (2006.01)

(52) U.S. Cl.
 CPC ..... H04N 21/4307 (2013.01); G06K 9/00744 (2013.01); G11B 27/322 (2013.01); H04N 7/0357 (2013.01); H04N 21/44008 (2013.01); H04N 21/4884 (2013.01); H04N 21/8456 (2013.01)

(58) Field of Classification Search
 CPC ................................................ H04N 21/23418
 USPC .................................................. 725/136, 146
 See application file for complete search history.

(56) References Cited

U.S. PATENT DOCUMENTS

| 2011/0050995 A1 | 3/2011 | Ozawa et al. |
| 2012/0143606 A1 | 6/2012 | Pham |
| 2014/0002736 A1 | 1/2014 | Kaushal et al. |

FOREIGN PATENT DOCUMENTS

| WO | 2007149100 A2 | 12/2007 |
| WO | 2015160630 A1 | 10/2015 |

OTHER PUBLICATIONS

GB Intellectual Property Office, Search Report for GB Application No. 1606743.1, dated Sep. 26, 2016, 1 page.

Primary Examiner — Dominic D Saltarelli
(74) Attorney, Agent, or Firm — Michael Best & Friedrich LLP

(57) ABSTRACT

To monitor audio-visual content which includes captions, caption fingerprints are derived from a length of each word in the caption, without regard to the identity of the character or characters forming the word. Audio-visual content is searched to identify a caption event having a matching fingerprint and missing captions; caption timing errors and caption discrepancies are measured.

19 Claims, 3 Drawing Sheets

MONITORING AUDIO-VISUAL CONTENT WITH CAPTIONS

BACKGROUND

This invention relates monitoring audio-visual content with captions.

SUMMARY

In one aspect, the present invention consists in a method of monitoring audio-visual content which includes a succession of video images and a plurality of caption events, each caption event being associated with and intended to be co-timed with a respective string of successive images, the method comprising the steps of processing a caption event to derive a caption event fingerprint; searching audio-visual content to identify a caption event matching a defined caption event fingerprint; analysing any matching caption event; and measuring any caption event error.

In another aspect, the present invention consists in a system for monitoring audio-visual content which includes a succession of video images and a plurality of caption events, each caption event being associated with and intended to be co-timed with a respective string of successive images, the system comprising: at least first and second fingerprint generators operating in a content delivery chain at respective locations upstream and downstream of defined content manipulation process or processes, each fingerprint generator serving to process a caption event to derive a caption event fingerprint; and a fingerprint processor serving to compare caption event fingerprints from the respective fingerprint generators to identify matching caption events; and to measure any caption event error.

The measured caption event error may be selected from the group consisting of a missing caption event; a caption event timing error and a caption discrepancy. Timing may be determined relative to the succession of video images of the identified caption event.

A caption event may comprise a plurality of words, each formed from one or more characters, and the caption event fingerprint may be derived from a length of each word in the caption event, without regard to the identity of the character or characters forming the word. Where the caption event comprises a caption image, the length of each word in the caption event may be determined by: analysing the caption image to identify caption image regions corresponding respectively with words in the caption; and determining a horizontal dimension of each such caption image region. A caption image may be analysed to identify caption image regions corresponding respectively with lines of words in the caption and the length of a word is represented as a proportion of the length of a line.

The length of a word is represented as a proportion of the length of a line containing the word. Alternatively, a measurement window of audio-visual content is defined containing a plurality of caption events and the length of a word is represented as a proportion of the representative line length derived from the measurement window. The representative line length may be the average line length in the measurement window or the length of a representative line in the measurement window, for example the longest line, the line with the greatest number of words, or the temporally closest line.

In the preferred arrangements, the text of a caption event cannot be derived from the caption event fingerprint.

In some arrangements, a plurality of measured caption event errors are combined to generate a flag indicating whether or not captions are acceptable.

BRIEF DESCRIPTION OF THE DRAWINGS

The invention will be described by way of example with reference to the accompanying drawings, in which.

DESCRIPTION OF PREFERRED EMBODIMENTS

Figure 1:
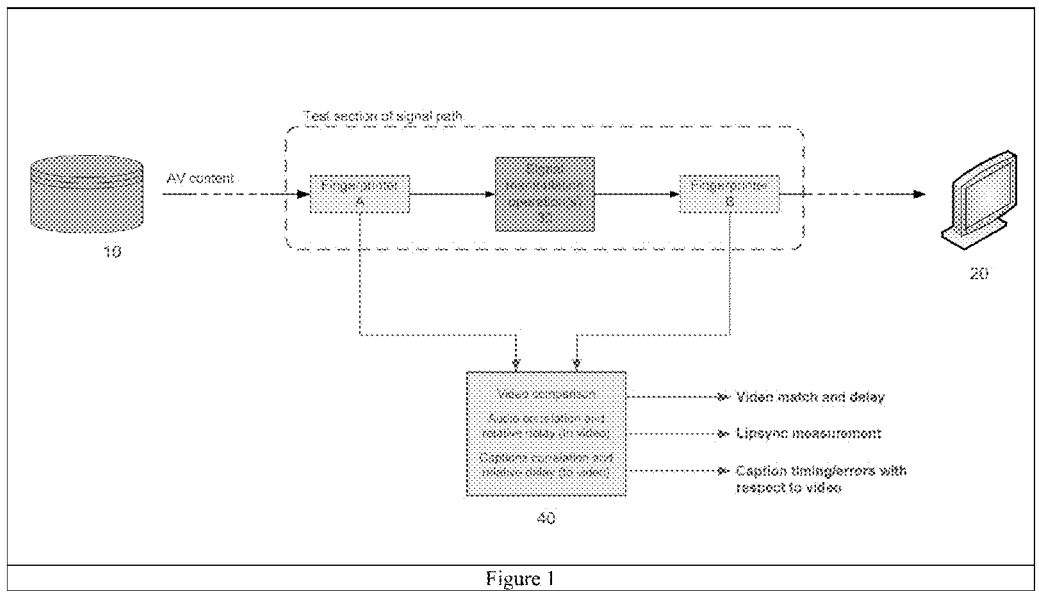
FIG. 1 is a diagram illustrating captions monitoring across part of a broadcast chain.

Embodiments of this invention provide for the matching of video captions originating from different points in a broadcast chain for the purposes of checking their integrity, absolute delay, and delay changes relative to video, and for the measuring of errors.

Unlike video and audio which both involve fixed sample rates (albeit in various standards), captions are intrinsically non-periodic. A caption will generally be associated with a string of video images, with the strings varying in length from caption to caption. This means that the task of correlating two sources of caption data is fundamentally different to the task of correlating video and or audio.

Caption errors can take various forms. A caption may be missing; there may be a timing error or other caption discrepancies. There may be a number of qualitative differences that individually or in combination degrade the 'user experience' by. Missing caption events, character errors, differences in white spaces, colour, position, or display time differences are all of relevant, but the importance of each may be subjective. It would be very useful to combine these into a score which reflects whether a caption channel is being delivered with acceptable quality. This disclosure provides basic underlying measurements that are necessary to contribute to such a qualitative score, and makes some suggestions regarding a more general subjective measurement.

A further issue is that, captions can exist in multiple different formats—some of which are not easy to compare. Therefore a matching approach based on a particular transport protocol or wrapper is undesirable. A considerable number of caption formats exist, but broadly they occur in two categories; they can be text-based or image-based. Comparing these two types is a challenge: for example verifying that the end of a Freeview broadcast contains DVB captions that are timed correctly against the original text specification they were derived from. In principle, this type of comparison can be tackled by first using Optical Character Recognition (OCR) to extract text from images before addressing the text matching problem. Established OCR algorithms exist which could be used. But there is naturally a processing overhead—analysis to extract characters and correct errors against a known dictionary, involves considerable effort. (It does of course provide a route to dictionary look-up and language detection and more advanced analysis, but comes at a price).

It would in many cases be advantageous to have solutions to text comparison and image/text matching which removes the need for OCR.

As mentioned, a wide range of caption formats exist. These differ between delivery systems (traditional broadcast, internet, DVD, Blu-ray, cinema etc) and also differ between territories. For example, UK Freeview broadcasts carry image-based DVB captions, whereas US captions are broadcast in text-based EIA-608 or CEA-708 format, and in Europe the text-based OP-47 standard is in use.

The DVB standard (EN 300-743) defines a bitmap subtitling format, which allows for greater flexibility (e.g. enabling non-alphabetic languages such as Arabic or Japanese to be carried), but obviously at greater bandwidth cost. Region 2 DVDs carry image based subtitles in the VOB file of the DVD. Region 1 DVDs commonly contain EIA-608 data decidable from the picture edge. Blu-ray m2ts format supports an image-based type called the PGS (Presentation Graphic Stream) which are bitmaps. For internet delivery, again, multiple standards exist, and include both text and/or image-based types. Synchronized Multimedia Integration Language (SMIL) supports both images and text (although it supports far more than just captions), and Timed Text Markup Language (TTML) is an authoring and transcoding standard used to repurpose television content for the internet.

It would be advantageous to be able automatically to measure and report the integrity of, and timing consistency of closed captions with respect to the video they are associated with, throughout a broadcast system or other content delivery systems.

In some embodiments, this is done with the assistance of existing audio-visual fingerprinting and correlation techniques, by introducing an additional fingerprint component (or separate data channel) which carries captions that have a known temporal linkage to the video fingerprint (i.e. timecode or frame count). The basic idea is depicted in the simplified diagram shown in FIG. 1. This builds on lip sync technology, but between captions and video rather than between audio and video. It also differs from lip sync technology in the fact that audio and video are continuous whereas closed captions are intrinsically irregular in nature, depending on content.

FIG. 1 is a simplistic representation of a broadcast system signal path from a server 10 which plays out AV content to viewers, one of which is illustrated schematically at 20. Generalised signal manipulation operations are shown at 30.

At appropriate locations over a test section of the signal path, two or more fingerprint generators are inserted. These are represented in FIG. 1 by Fingerprinter A and Fingerprinter B, which are disposed on opposite sides of the signal manipulation operations 30. Each fingerprint generator produces:

Video fingerprint data
Audio fingerprint data
Captions data

The video fingerprint data and audio fingerprint data can be generated in a wide variety of known ways. Reference is directed, for example to WO 2009/104022 (the disclosure of which is herein incorporated by reference) which provides examples of video and audio signature generation techniques.

The video fingerprint, audio fingerprint and captions data is provided by any convenient means (for example an IP network) to a fingerprint comparison unit 40. This may conduct:

Video comparison
Audio correlation and relative delay (to video)
Captions correlation and relative delay (to video)

In what follows, attention will be focused on the generation of captions data and the comparison of captions data with (usually) video fingerprint data.

Captions Data

In the SDI domain, closed captions are commonly carried in ancillary data that is intrinsically linked to the video. But it can be extracted, manipulated or modified and reinserted—for example by a television standards converter. For this reason, timing changes to the video can be introduced as the signal propagates through the broadcast chain. The point of interest is whether, at given point in the processing cascade (typically near the end), the timing of the captions relative to the video is the same, similar to or different to the original temporal alignment of the captions (i.e. what the content creator intended).

In modern broadcast setups, captions are commonly converted to images during the chain before distribution to the consumer—MPEG transport streams carry image-based captions (and display times) but they can also contain text-based ones. Preferred arrangements for measuring and reporting caption presence, delay and jitter would operate irrespective of caption carrier format (i.e. agnostic of text or images), so that the fundamental question of caption timing errors is the same, whatever format exists at the reference points.

Comparison of raw closed caption data bytes (e.g. EIA-608, "line 21" captions)—which are embedded in the video fields—is troublesome, not least because caption modifications or timing changes do not generally just shift the raw data stream forwards or backwards—i.e. not a simple n-byte delay.

Figure 2:
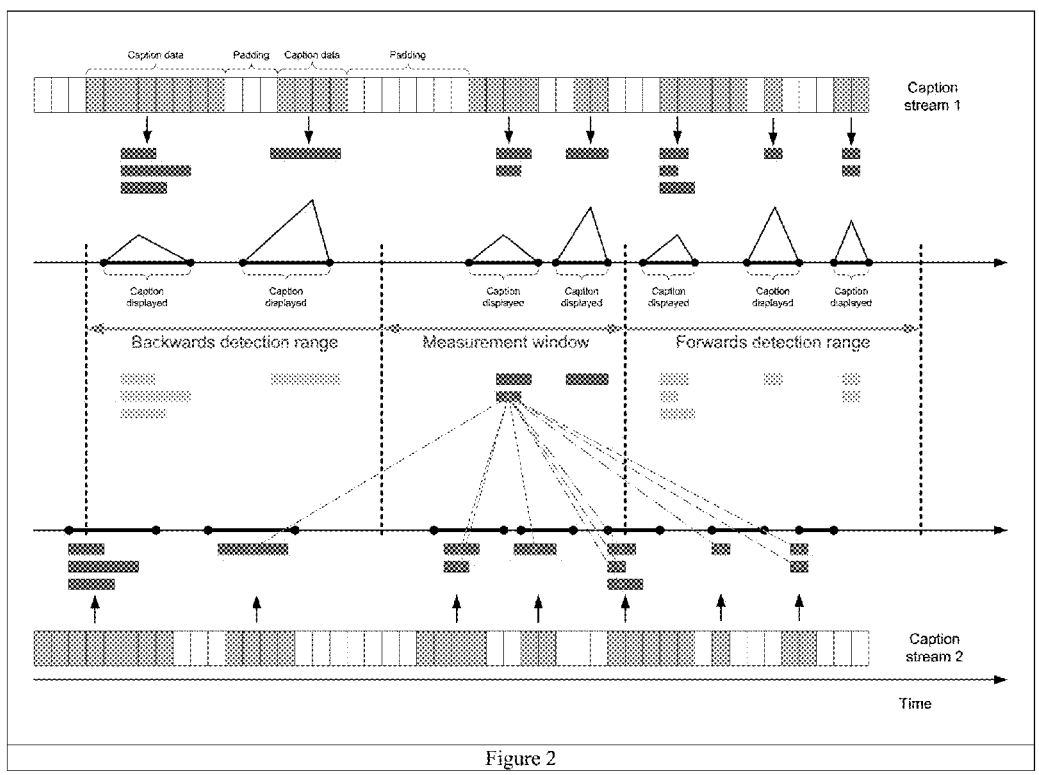
FIG. 2 is a diagram illustrating searching to identify a matching caption.

To measure the caption timing (delay and jitter), the raw stream is decode as far as the text strings involved, and the frames at which they start and stop being displayed on the screen. FIG. 2 illustrates the basic approach. (This is a simplistic representation—in reality the raw caption streams need to be buffered in order to interpret the raw data and decode lines of text. In other words, there is obviously a causal relationship here—but FIG. 2 illustrates the essential point.)

The blue (top) and orange (bottom) rectangles here represent lines of text (not words). The comparison involves taking each line from each caption event in one stream (in the diagram, stream 1) within a given temporal measurement window, and comparing it with each line in each caption event in the other stream, within a range that included the same measurement window, plus and minus a detection region.

A given caption might be a start and stop timecode and multiple lines of text, and in this analysis, each line constitutes a separate event. The idea is, to decode the caption data to an appropriate representation (for example similar to Subrip (.srt)) and treat text lines as events. For example, the srt specification;

1
00:00:44,581→00:00:46,556
(SIMPLE TUNE)
2
00:00:53,381→00:00:55,356
Ha-ha-ha.

3
00:00:55,381→00:00:57,636
Very good. So? Are you confident?
4
00:00:57,661→00:01:00,276
She's gonna smash it, aren't you,
babes? Bring it on!
contains three captions that carry single lines of text—three events. The fourth caption involves two lines—so two events (but with the same start/stop times).

For each event line matched, a delay value can be deduced from by comparing the difference in display times. These might be field numbers or time codes. These need not necessarily be absolute time references—just an indexing which defines in stream 1 on which field in stream 1 the caption events of stream 1 start and stop. Similarly with stream 2. Correlation of the video fingerprints between streams 1 and 2 determines which fields are corresponding (irrespective of timecodes). This match then constitutes a reference that allows the relative timing of caption event start/stop times to be compared.

The caption event line matching described above provides a timing measurement for every line of every caption event in the measurement window. The number of lines and events is both content dependent and dependent on the choice of window size, but a window size of say 4 seconds, with a detection range of +/−10 seconds is commensurate with audio and video media matching and lip sync measurement and typically such a choice would lead to 0-6 caption lines being matched.

With audio and video, delay errors are generally quasi-static (eyes and ears are very sensitive to jitter, so systems are generally strict about delay consistency). This is not necessarily true of captions, which may exhibit jitter. The measurement described for individual caption lines provides a means of measuring (and hence reporting) caption timings both in terms of fixed (quasi-static) delays and any jitter that is present.

For text captions (e.g. EIA-608, EIA-708 or OP-47), the matching of lines can be done using known text-text correlation technology.

Figure 3:
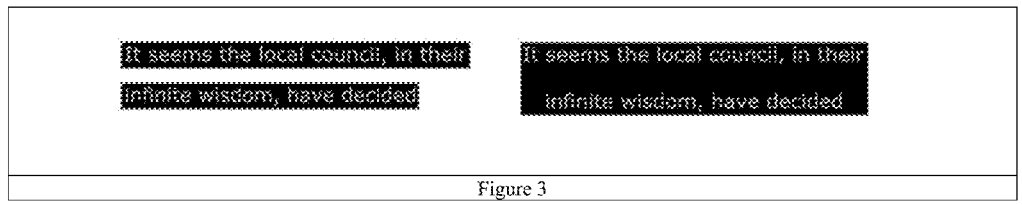
FIG. 3 gives an example of a caption at different stages in a broadcast train.

The comparison of image and text based captions is less straightforward. In fact, even the of image captions in one source against image captions in another source is not straightforward, as the example in FIG. 3 shows. In FIG. 3 there is shown actual captions from broadcast output, being essentially the same AV content (the same episode of an episodic programme) but broadcast at different times on different channels. In this case, one can see that simply comparing bitmap headers for example, or image checksums, would not be helpful, with two caption images having been converted during the delivery chain to a single caption image.

Extraction of the text from the images by OCR, followed by text-text correlation as described in the previous section is an obvious way forward, as discussed above.

Preferred embodiments of this invention provide an alternative strategy, which avoids the processing complexity of full OCR by deriving a caption fingerprint from a length of each word in the caption event, without regard to the identity of the character or characters forming the word. In the example described here, the correlation is based on word lengths as a proportion of the text line they appear in, using these as the fundamental "atomic" units for matching.

In this described example, "word length" means not just the number of characters in each word (although that is a significant factor), but the length a word takes up as displayed. E.g. "WARMER" is 6 characters long, but as displayed, is longer than "LIVING" which is also 6 characters long. Although display lengths do vary by font, the relative word lengths are typically similar.

Display lengths for text-based captions can easily be determined, for example by the use of a pre-calculated look-up table based on font averages. Display lengths for image-based captions can be determined by a series of steps which are similar to commonly used initial steps of OCR techniques, but are far simpler, and involve far less processing effort. It is not necessary to perform full OCR to obtain the word lengths from a captions image.

Figure 4:
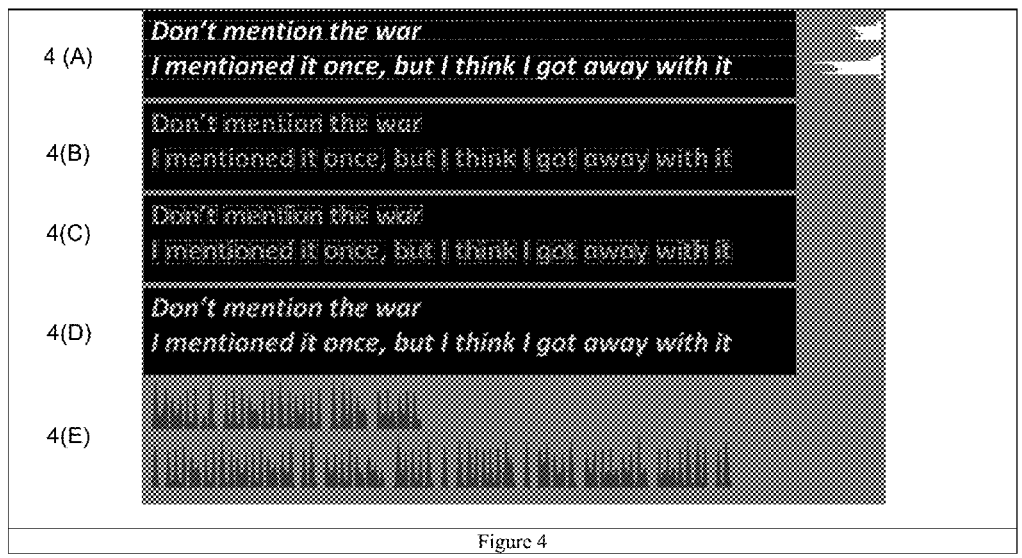
FIG. 4 is a diagram illustrating caption image analysis.

In one example, the lengths of words in image based captions are recovered with the following steps:

1. Convert all input images to white-on-black (binarise the input greyscale, count black/white ratio and invert the image if necessary)
2. Sum rows of binarised image, and seek each text line start/stop image rows based on occupied rows. This determines the number of text lines in the image, and the pixel start/stop row of each text line
3. Low pass filter the input image
4. Estimate italic slant by gradient estimation (for example: 1D Lucas-Kanade type approach) between adjacent lines—using the pre-filtered image.
5. Interpolate the input (unfiltered) image to correct for italic slant, and binarise the result
6. Sum columns of each text line in slant-corrected image between detected start/stop image rows to generate a horizontal histogram.
7. Histogram lengths of consecutively un-occupied bins in horizontal histogram to generate a "gaps histogram"
8. Detect the maxima in the gaps histogram (this is the initial inter-character spacing estimate)
9. From the maxima, increment bins to detect an unoccupied bin. From this bin upwards, detect the first occupied bin. This is the lower-end estimate of the inter-word spacing
10. Detect the maximum occupied bin in the gaps histogram—this is the upper-end estimate of the inter-word spacing
11. From the initial inter-character spacing estimate, and the lower and upper end inter-word spacing estimates, form a threshold to discriminate between inter-character and inter-word spacings
12. Then re-test the horizontal histogram of each line to determine which gaps (consecutive unoccupied bins) correspond to letter gaps and which correspond to word gaps. This test also gives the pixel start/stop positions of letters and words in the detected lines FIG. 4 illustrates these steps as applied to a caption image containing two lines. The input image is shown at 4(A). Also shown at the right of the image are row histograms of the binarised input image, used to detect line start/stop rows. FIG. 4 shows the identified word rectangles at 4(B). The detected words are shown overlaid on slant-corrected version of the input image. FIG. 4 also shows at 4(C) the character rectangles identified. Experiments reveal that the words are easier to determine reliably than the letters, and the primary basis of the matching proposed in this disclosure is the words. The letters are simply a point of interest here. (Letters can merge and words can be split (or merged). These are well known hurdles in fully-fledged OCR.) Shown at 4(D) is a filtered input image (luma (inverted) 3×3 box filter), which can be used for slope estimation. Shown at 4E are line histograms (column sums [of (unfiltered, inverted) luma of input image after italics correction] between detected line stop/start rows)

Having determined the word rectangles from each line, the line is then characterised by a set of percentages which represent the percentage that each word is relative to the sum of word rectangle lengths.

At the matching stage, for every video field processed, each caption event (line) in the measurement window of one stream is tested as a match against each caption event (line) in the other stream over a range which included the same measurement window, plus and minus a specified detection range, as illustrated in FIG. 2. For two lines, A and B, the match between them is determined by;

$$w_k^{Line\ A} = \frac{100 \times Width_k^{Line\ A}}{\sum_{i=0}^{Words-1} Width_i^{Line\ A}}$$

$$w_k^{Line\ B} = \frac{100 \times Width_k^{Line\ B}}{\sum_{i=0}^{Words-1} Width_i^{Line\ B}}$$

$$M_{A,B} = 1 - \sum_{k=0}^{Words-1} \left| \frac{w_k^{Line\ A} - w_k^{Line\ B}}{w_k^B} \right|$$

Where $Width_k^{Line\ A}$ is the length of the kth word in line A in pixels, and $Width_k^{Line\ B}$ is the kth word in line B in pixels. (The units are pixels, irrespective of whether the captions originate from images or from text: in the image case, the word widths are determined as described above by the simplified image analysis. If the captions originate from text, the word widths are determined from a look table of average font display widths)

Matches are only sought for lines which have greater than one word, and comparisons are only made between lines with the same number of words in them. For each event in the measurement window, the best $M_{A,B}$ match value is selected—this is effectively a match confidence—and accepted if it is greater than a specified acceptance threshold, τ. For each match, a corresponding delay value is calculated. The collection of matched events within the detection window then allows an average confidence and average delay to be calculated (and of course other measurements such as min and max values). A record of the number of captions in the measurement window, the number of matched events and the number of unmatched events are also made.

Matching is conducted A to B as well as B to A, because these are not necessarily symmetric. For example, if some events were lost from one channel, this might still indicate a good match to the other, but not vice versa.

Figure 5:
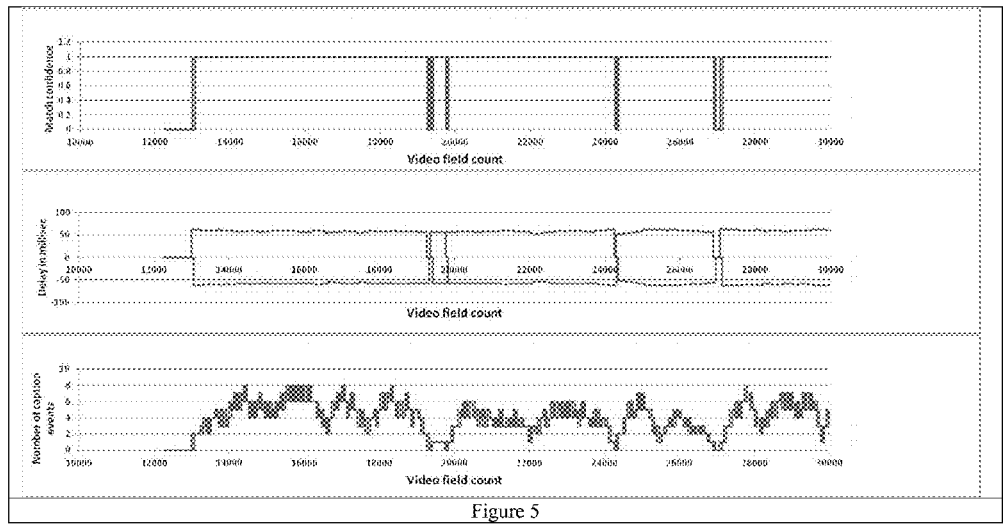
FIG. 5 illustrates caption matching between two text-based caption fingerprints.

FIG. 5 below shows an example of caption matching between two text-based caption fingerprints. These correspond to two different Freeview broadcasts of the same episode of the BBC's Eastenders, from 1 Dec. 2015. One is from BBC1 broadcast at 7:30 pm, the other from the re-broadcast of the same episode on BBC3 at 10 pm. Of course, the original broadcasts involve DVB bitmap captions, not text, and here a statement of matching text-based captions relates to the transport streams having been decoded and non-realtime OCR tools being used to recover the text in .srt format, then fingerprinting using the .srt as input.

FIG. 5 shows matching of stream 1-2 and vice versa, with match confidence at the top, delay value in the centre plot, and the number of caption events in the measurement window at the bottom. In this example, the measurement window is 8 seconds wide, the detection range is +/−10 seconds, and the peak acceptance threshold τ=0.95. The slight x-axis displacement between them is a facet of there being a small delay between the fingerprints, which is also reflected in the fact the 2-1 match reports approximately −60 ms delay, whereas the 2-1 match reports approximately +60 ms delay. (N.B. The video field rate is 50 Hz, thus the field period is 20 ms. The smaller fluctuations in delay shown in FIG. 5 appear to arise because the display times decoded from the transport stream in for caption images, e.g. 00:00: 53,381 (hours, mins, sec, ms) either contain minor errors intrinsically (and just get rendered to the nearest field) or are not decoded with strictly accurate timestamps by the analysis tool used to extract them.

Note that, some gaps do occur, where there are periods over which no captions are specified.

Figure 6:
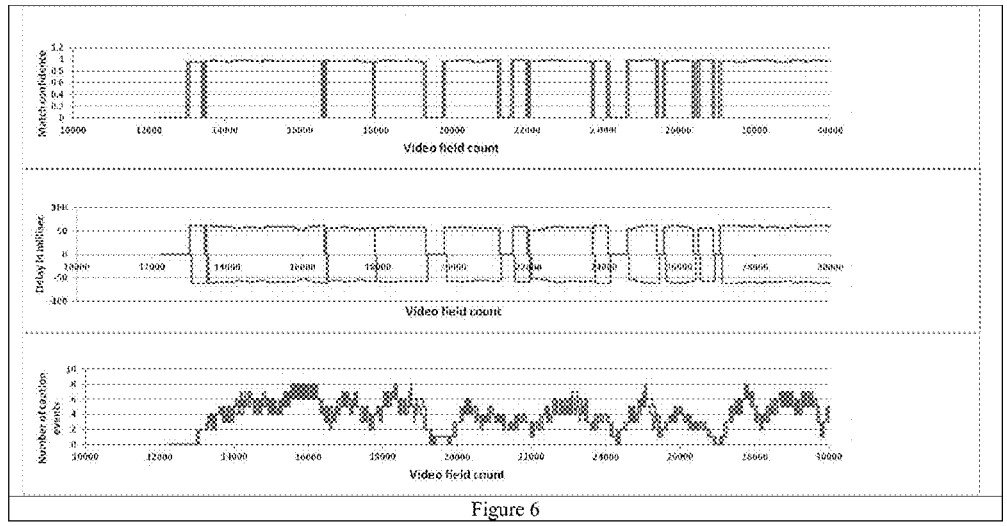
FIG. 6 illustrates caption matching between text-based and image-based caption fingerprints.

FIG. 6 shows a corresponding set of graphs—for the same two broadcasts—but where the matching is between text-based captions on the BBC1 broadcast, and DVB image captions on the BBC3 broadcast.

The match confidence here is the average value of $M_{A,B}$ defined above, and although this is slightly less than 1.0 (i.e. slightly less than the corresponding plot in FIG. 5 or text-text matching), it is very close. This is understandable—the text-image matching is a harder problem—and still a viable comparison. Even if the image analysis step correctly identifies the right word rectangles, the percentage word widths predicted by the text character look-up may sometimes be slightly mismatched, in some circumstances because the font of the image is not known. Furthermore, there are more gaps in this case, which arise when caption lines involve just one word.

There are numerous simple techniques by which this might be improved by doing a second pass of the measurement window events—once the match of multi-word lines has been done—whereby the width of single word events is measured (and matched) according to a percentage of the average line length in the measurement window, or the longest, or the one with the greatest number of words, or the temporally closest etc.

The gaps which occur with text-text matching and text-image matching, may be relevant if it is desired to monitor the 'user experience' by qualitative differences, and report whether a caption channel is being delivered with acceptable quality. When no match occurs—because there are no caption events (which happens several times in FIG. 5 and FIG. 6)—this is not a systemic failure. Similarly, a delay of a field or two—in caption appearance terms to humans—is probably not a big concern.

Having performed an "agnostic" matching of captions, the next task is to map the results into an acceptable (useful) reporting metric. One way to filter the matching results is by incorporating a state machine. Putting aside potential questions about the start-up conditions, a basic strategy is to report 'good' when captions are matched, providing the delay is within some user specified threshold. When caption matching returns no matches, a temporal counter is started, which is incremented every subsequent field for which no matches are found. If a match is encountered, the counter is set to zero, otherwise, if the counter reaches a specified limit (say 30 seconds) (and the input fingerprints do contain caption events), then a 'fail' is flagged.

Additional state machine inputs may include; the number of unmatched events, the text colour, text screen position, and in the case of text-based matching; character errors and white space differences. Each of these pieces of data provides further information about the goodness of the caption match.

There has been disclosed an automatic, format agnostic method for matching caption streams to determine equivalence and delay relative to the video with which they are associated. By their nature, the event matching is sporadic, so a state machine may be used to filter the results and generate a simple but meaningful output flag.

It should be understood that this invention has been described by way of example only.

Thus, there will be other ways—beyond those described above—of processing a caption event to derive a caption event fingerprint. Preferably the processing is such that the text of a caption event cannot be derived from the caption event fingerprint. In preferred arrangements, the caption event fingerprint is derived from a length of each word in the caption event, without regard to the identity of the character or characters forming the word. Where the caption event comprises a caption image, the length of each word in the caption event can be determined in a variety of ways by analysing the caption image to identify image regions corresponding respectively with words in the caption; and measuring a horizontal dimension of each image region. The image regions usually correspond respectively with lines of words in the caption and the length of a word is represented as a proportion of the length of a line.

The invention claimed is:

1. A method of monitoring audio-visual content which includes a succession of video images and a plurality of caption events, each caption event being associated with and intended to be co-timed with a respective string of successive images, the method comprising the steps in at least one processor of:
   processing a caption event to derive a caption event fingerprint;
   searching audio-visual content to identify a caption event matching a defined caption event fingerprint;
   analysing any matching caption event; and
   measuring any caption event error;
   in which the caption event comprises a plurality of words, each formed from one or more characters, wherein the caption event fingerprint is derived from a length of each word in the caption event, without regard to the identity of the character or characters forming the word.

2. The method of claim 1 where the measured caption event error is selected from the group consisting of a missing caption event; a caption event timing error and a caption discrepancy.

3. The method of claim 1, further comprising the step of determining the timing relative to the succession of video images of the identified caption event.

4. The method of claim 1 in which the caption event comprises a caption image, wherein the length of each word in the caption event is determined by:
   analysing the caption image to identify caption image regions corresponding respectively with words in the caption; and
   determining a horizontal dimension of each such caption image region.

5. The method of claim 4, where the caption image is analysed to identify caption image regions corresponding respectively with lines of words in the caption and the length of a word is represented as a proportion of the length of a line.

6. The method of claim 5, where the length of a word is represented as a proportion of the length of a line containing the word.

7. The method of claim 5, where a measurement window of audio-visual content is defined containing a plurality of caption events and the length of a word is represented as a proportion of the representative line length derived from the measurement window.

8. The method of claim 7, where the representative line length from the measurement window is selected from the group consisting of: the average line length; the length of a representative line; the length of the longest line; the length of line with the greatest number of words, or the length of the temporally closest line.

9. The method of claim 1 where the text of a caption event cannot be derived from the caption event fingerprint.

10. A system for monitoring audio-visual content which includes a succession of video images and a plurality of caption events, each caption event comprising a plurality of words, each word formed from one or more characters, each caption event being associated with and intended to be co-timed with a respective string of successive images, the system comprising:
    at least first and second fingerprint generators operating in a content delivery chain at respective locations upstream and downstream of defined content manipulation process or processes, each fingerprint generator serving to process a caption event to derive a caption event fingerprint from a length of each word in the caption event, without regard to the identity of the character or characters forming the word; and
    a fingerprint processor serving to compare caption event fingerprints from the respective first and second fingerprint generators to identify matching caption events; and to measure any caption event error selected from the group consisting of a missing caption event; a caption event timing error and a caption discrepancy.

11. The system of claim 10, each fingerprint generator serving to record the timing of that caption event and the fingerprint processor serving to determine the timing relative to the succession of video images of each matched caption event.

12. The system of claim 10 in which the caption event comprises a caption image, wherein the length of each word in the caption event is determined by:
    analysing the caption image to identify caption image regions corresponding respectively with words in the caption; and
    determining a horizontal dimension of each such caption image region.

13. The system of claim 12, where the caption image is analysed to identify caption image regions corresponding respectively with lines of words in the caption and the length of a word is represented as a proportion of the length of a line.

14. The system of claim 13, where the length of a word is represented as a proportion of the length of a line containing the word.

15. The system of claim 13, where a measurement window of audio-visual content is defined containing a plurality of caption events and the length of a word is represented as a proportion of the representative line length derived from the measurement window.

16. The system of claim 15, where the representative line length is the average line length in the measurement window or the length of a representative line in the measurement window, for example the longest line, the line with the greatest number of words, or the temporally closest line.

17. A non-transient computer readable medium containing instructions causing a processor to implement a method of monitoring audio-visual content which includes a succession of video images and a plurality of caption events, each caption event being associated with and intended to be co-timed with a respective string of successive images, the method comprising the steps in at least one processor of:
- processing a caption event to derive a caption event fingerprint;
- searching audio-visual content to identify a caption event matching a defined caption event fingerprint;
- analysing any matching caption event; and
- measuring any caption event error, where the measured caption event error is selected from the group consisting of a missing caption event; a caption event timing error and a caption discrepancy;

in which the caption event comprises a plurality of words, each formed from one or more characters, wherein the caption event fingerprint is derived from a length of each word in the caption event, without regard to the identity of the character or characters forming the word.

18. The computer readable medium of claim 17, in which the caption event comprises a plurality of words, each formed from one or more characters, wherein the caption event fingerprint is derived from a length of each word in the caption event, without regard to the identity of the character or characters forming the word.

19. The computer readable medium of claim 18 in which the caption event comprises a caption image, wherein the length of each word in the caption event is determined by:
- analysing the caption image to identify caption image regions corresponding respectively with words in the caption; and
- determining a horizontal dimension of each such caption image region.

* * * * *